United States Patent
Schunk et al.

(10) Patent No.: US 10,053,096 B2
(45) Date of Patent: Aug. 21, 2018

(54) METHOD OF OPERATING A MOTOR VEHICLE DRIVEN ELECTRICALLY AT LEAST TEMPORARILY ON A ROADWAY, CONTROL UNIT FOR A MOTOR VEHICLE, AND CORRESPONDING MOTOR VEHICLE

(71) Applicant: AUDI AG, Ingolstadt (DE)

(72) Inventors: Karin Schunk, Ingolstadt (DE); Christoph Ullrich, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/428,415

(22) Filed: Feb. 9, 2017

(65) Prior Publication Data
US 2017/0225682 A1    Aug. 10, 2017

(30) Foreign Application Priority Data
Feb. 10, 2016    (DE) .......................... 10 2016 001 495

(51) Int. Cl.
*B60W 30/12*    (2006.01)
*B60W 30/14*    (2006.01)
(Continued)

(52) U.S. Cl.
CPC .............. *B60W 30/165* (2013.01); *B60L 5/38* (2013.01); *B60Q 1/346* (2013.01);
(Continued)

(58) Field of Classification Search
CPC .......... B60W 30/165; B60W 30/18163; G05D 1/021; G05D 2201/0212; B60Q 1/346;
(Continued)

(56) References Cited

U.S. PATENT DOCUMENTS

| | | | |
|---|---|---|---|
| 8,928,468 B2 | 1/2015 | Ullrich | |
| 2010/0121509 A1 | 5/2010 | Takeshima et al. | |
| 2010/0207787 A1* | 8/2010 | Catten | G06F 17/30241 340/905 |
| 2011/0153184 A1 | 6/2011 | Suh | |

(Continued)

FOREIGN PATENT DOCUMENTS

| | | |
|---|---|---|
| DE | 44 17 065 A1 | 1/1995 |
| DE | 10 2008 055 881 A1 | 5/2010 |

(Continued)

OTHER PUBLICATIONS

R. Horowitz et al.: "An efficient lane change maneuver for platoons of vehicles in an automated highway system", University of California Berkeley, May 2004.

(Continued)

*Primary Examiner* — Michael J Zanelli
(74) *Attorney, Agent, or Firm* — Henry M. Feiereisen LLC

(57)    ABSTRACT

In a method of operating a motor vehicle driven electrically, at least temporarily, on a roadway, the motor vehicle is moved fully autonomously by a control unit in response to a command for automatic operating mode. After a charging arm of the motor vehicle has been extended, a lateral control of the motor vehicle is executed to bring the extended charging arm into electric contact with a charging line arranged at or on the roadway. As a result, electric energy provided from the charging line to the charging arm is used for charging an energy accumulator of the motor vehicle and/or operating a drive device of the motor vehicle for moving the motor vehicle. A longitudinal control of the motor vehicle is executed to thereby maintain a predefined longitudinal speed of the motor vehicle until a distance of the motor vehicle reaches a predefined minimum distance to a leading vehicle.

14 Claims, 3 Drawing Sheets

(51) Int. Cl.
*B60W 30/165* (2012.01)
*G08G 1/00* (2006.01)
*B60W 30/18* (2012.01)
*B60Q 1/34* (2006.01)
*B60L 5/38* (2006.01)
*G05D 1/02* (2006.01)
*B60M 1/00* (2006.01)

(52) U.S. Cl.
CPC ....... *B60W 30/18163* (2013.01); *G05D 1/021* (2013.01); *G08G 1/22* (2013.01); *B60M 1/00* (2013.01); *G05D 2201/0212* (2013.01)

(58) Field of Classification Search
CPC ..... G08G 1/22; B60L 5/38; B60L 9/00; B60L 15/38; B60M 1/00; Y02T 10/7275
See application file for complete search history.

(56) References Cited

U.S. PATENT DOCUMENTS

2017/0106767 A1* 4/2017 Tajima .................. B60M 1/36
2017/0129342 A1* 5/2017 Tajima .................. B60L 5/39

FOREIGN PATENT DOCUMENTS

DE 10 2012 214 753 A1 11/2013
DE 10 2014 000 843 A1 8/2014

OTHER PUBLICATIONS

Dehlia Willemsen et al.: "Automated driving functions giving control back to the driver: A simulator study on driver state dependent strategies", TNO, the Netherlands, 2015.

* cited by examiner

METHOD OF OPERATING A MOTOR VEHICLE DRIVEN ELECTRICALLY AT LEAST TEMPORARILY ON A ROADWAY, CONTROL UNIT FOR A MOTOR VEHICLE, AND CORRESPONDING MOTOR VEHICLE

CROSS-REFERENCES TO RELATED APPLICATIONS

This application claims the priority of German Patent Application, Serial No. 10 2016 001 495.4, filed Feb. 10, 2016, pursuant to 35 U.S.C. 119(a)-(d), the disclosure of which is incorporated herein by reference in its entirety as if fully set forth herein.

BACKGROUND OF THE INVENTION

The present invention relates to a method of operating a motor vehicle driven electrically, at least temporarily, on a roadway, to a control unit for a motor vehicle, and to a corresponding motor vehicle.

The following discussion of related art is provided to assist the reader in understanding the advantages of the invention, and is not to be construed as an admission that this related art is prior art to this invention.

A motor vehicle can be driven electrically, at least temporarily, through installation of an electric machine, and thus can be constructed as electric vehicle or as hybrid vehicle. Electric energy for moving the motor vehicle can be generated in the case of a hybrid vehicle by a drive unit, e.g. an internal combustion engine, in combination with a generator. In the case of an electric vehicle, electric energy is to be supplied externally, e.g. through a charging process at a charging station or power outlet.

It would be desirable and advantageous to address prior art shortcomings and to enable a continuous travel operation of a motor vehicle while providing utmost comfort for a driver of the motor vehicle.

SUMMARY OF THE INVENTION

According to one aspect of the present invention, a method of operating a motor vehicle driven electrically, at least temporarily, on a roadway includes moving the motor vehicle fully autonomously by a control unit in response to a command for automatic operating mode, executing a lateral control of the motor vehicle to electrically contact an extended charging arm with a charging line arranged at or on the roadway to generate electric energy for charging an energy accumulator of the motor vehicle and/or operating a drive device of the motor vehicle for moving the motor vehicle, and executing a longitudinal control of the motor vehicle to thereby maintain a predefined longitudinal speed until a distance of the motor vehicle reaches a predefined minimum distance to a leading vehicle.

The command for automatic operating mode can, for example, be initiated by the driver of the motor vehicle and/or a driver assist system. The command can be implemented by the driver through actuation of an operating element, e.g. a button, switch, or the like. As soon as the command for automatic operating mode is received, the control unit assumes the driving mode of the motor vehicle, i.e. the control unit automatically operates the motor vehicle in a fully autonomous driving mode that does nor require any action on the part of the driver. The control unit is hereby configured to assume both longitudinal control and lateral control of the motor vehicle. Longitudinal control relates to an adjustment of the travel speed or longitudinal speed in travel direction, whereas lateral control relates to, e.g. steering of the motor vehicle, i.e. selection and setting of a particular steering angle.

Lateral control of the motor vehicle is carried out to establish the electric contact between the charging arm and the charging line. The charging line is located at or on the roadway. For example, the charging line may be formed by a guardrail or crash barrier or form part thereof. In the latter case, the charging line may be configured as charging rail. It is, of course, also conceivable to realize the charging line in the form of an overhead line or the like. The charging arm is configured and placed on the motor vehicle such as to be able to interact with the charging line, regardless of its configuration, in order to effect the electric contact.

Advantageously, the charging arm is located on either side or sidewall of the motor vehicle. Normally, the charging arm is retracted into an appropriate receiving space of the motor vehicle, with a cover or flap provided to close the receiving space. When being moved out to an extended state, the charging arm projects beyond the side of the motor vehicle towards the charging line. Suitably, the charging arm includes a level control for allowing the charging arm to be adjusted in height so that the charging arm can be brought into alignment with the charging line that is located at that moment at or on the roadway.

Lateral control of the motor vehicle is implemented in such a way as to steer the motor vehicle in the direction of the charging line. The charging arm can be extended when initiating the fully autonomous driving mode or when the distance between the motor vehicle and the charging line drops below a predefined distance. Through appropriate execution of the lateral control, electric contact between the charging line and the charging arm can be realized. Once electric contact is established, electric energy can be supplied from the charging line via the charging arm to the motor vehicle to charge the energy accumulator and/or to operate the drive device of the motor vehicle.

The drive device drives the motor vehicle by producing the torque for propelling the motor vehicle. As soon as electric contact has been established between the charging arm and the charging line, the lateral control maintains the motor vehicle in a certain lane and/or keeps constant the distance between the motor vehicle and the charging line. In this way, provision of a comparably short charging arm is sufficient to realize a reliable and effective transmission of electric energy to the motor vehicle.

The fully autonomous driving mode of the motor vehicle includes also a longitudinal control. The predefined longitudinal speed is initially maintained until the distance of the motor vehicle to the leading vehicle, i.e. the vehicle that is driving directly in front of the motor vehicle in a same lane, has reached a predefined minimum distance or drops below the predefined minimum distance. The predefined longitudinal speed is selected such as to exceed the speed of the leading vehicle so as to be able to approach it until reaching the minimum distance.

The fully autonomous driving mode is implemented by the control unit which can be a component of a driver assist system of the motor vehicle. The control unit or driver assist system can include at least one sensor, e.g. a radar sensor, camera sensor, ultrasonic sensor, or the like.

With a method in accordance with the present invention, the range of the motor vehicle can be significantly increased because the charging line for providing electric energy is available, at least temporarily. At the same time, a fully autonomous driving mode of the motor vehicle is carried out when driving along the charging line. The driver of the motor vehicle has hereby the impression as if the motor vehicle is guided by the charging line. As a result, the driver feels comfortable in accepting the fully autonomous driving mode of the motor vehicle as compared to a situation in which the motor vehicle travels in a fully autonomous manner freely on the roadway in the absence of any interaction with a charging line. The greater acceptance is also perceived because the electric contact between the charging arm and the charging line is automatically established via the lateral control, without intervention by the driver. In particular, when an inexperienced driver is involved, possible uncertainties or uncomfort that the inexperienced driver may have can thus be eliminated.

According to another advantageous feature of the present invention, provision can be made for switching to an operating mode involving a convoy formation, referred to in the following description as convoy operating mode, when the motor vehicle has reached the minimum distance to the leading vehicle and the longitudinal speed of the motor vehicle has been adjusted to match the speed of the leading vehicle so that the motor vehicle maintains the minimum distance to the leading vehicle. A fully autonomous driving mode is thus provided also in the convoy operating mode, with the control unit assuming both the lateral control and the longitudinal control of the motor vehicle.

A convoy operating mode involves the formation of a convoy of the motor vehicle with the leading vehicle in a same lane, with the vehicles normally maintaining a constant distance from one another. For this purpose, the longitudinal speed is adjusted to match the speed of the leading vehicle, i.e. the speed of both vehicles is the same. Provision may be made to enable a switching from the automatic operating mode to the convoy operating mode only when the leading vehicle has also been equipped correspondingly so as to carry out the method of the present invention. This can be ascertained through respective data exchange of the motor vehicle with the leading vehicle. By maintaining the minimum distance to the leading vehicle, the required energy demand of the motor vehicle for executing the driving mode can be significantly reduced because the motor vehicle travels in the slipstream of the leading vehicle so that air resistance is reduced.

According to another advantageous feature of the present invention, the longitudinal speed of the motor vehicle can be adjusted to a first default speed after issuance of the command for automatic operating mode, and the longitudinal speed can be adjusted to a second default value once the charging line has been contacted by the charging arm. For example, provision may be made for the motor vehicle to move at a lower speed until reaching the charging line so as to enable the charging arm to reliably contact the charging line. In this way, the first default speed is thus smaller than the second default speed. Of course, the reverse is also possible so as to establish the contact of the charging arm to the charging line as rapidly as possible and to then carry out an energy-saving driving mode of the motor vehicle. It is also conceivable for the first and second default speeds to correspond to one another.

Currently preferred is, however, when the second default speed exceeds the speed of the (possibly) leading vehicle so as to be able to reduce the distance thereto. Provision may be made for example for the second default value to have a first value in the absence of a leading vehicle, and a second value in the presence of a leading vehicle. The first value is normally smaller than the second value. Thus, in the absence of a leading vehicle or no leading vehicle is detected, the first value of the default speed enables an energy-saving driving mode. Conversely, when the presence of a leading vehicle has been recognized, the motor vehicle is operated to catch up to the leading vehicle in order to further reduce energy consumption as a result of traveling in a convoy, i.e. to realize the convoy operating mode.

According to another advantageous feature of the present invention, the minimum distance can be selected as a function of the longitudinal speed. The minimum distance is hereby defined so as to ensure that the motor vehicle can be reliably decelerated at all times, regardless of the momentary travel maneuver of the leading vehicle. Advantageously, the minimum distance increases as the longitudinal speed increases.

According to another advantageous feature of the present invention, the longitudinal speed of the motor vehicle can be reduced relative to the leading vehicle in response to an indication of a further motor vehicle to merge so as to increase the distance to the leading vehicle and thereby provide a gap for the further motor vehicle, or the longitudinal speed of the motor vehicle can be increased relative to a trailing vehicle in response to an indication of a further motor vehicle to merge so as to increase a distance to the trailing vehicle and thereby provide a gap for the further motor vehicle. Advantageously, the further vehicle is also equipped to carry out the method according to the invention. The intent or indication from the further vehicle for merging can be transmitted to the motor vehicle, for example via a wireless connection, such as radio communication, and thus involves a merging by the further vehicle into the convoy of motor vehicle and leading vehicle and/or convoy of motor vehicle and trailing vehicle. This can thus be implemented by creating a gap for the further vehicle through increase of the distance to the leading vehicle as the longitudinal speed of the motor vehicle is reduced, or to the trailing vehicle as the longitudinal speed of the motor vehicle is increased. As soon as the gap has dimensions sufficient to allow merging of the further vehicle, the lateral control of the further vehicle steers the further vehicle into the gap. This may also be realized in a fully autonomous manner in the automatic operating mode.

According to another advantageous feature of the present invention, the longitudinal speed of the motor vehicle can be reduced relative to the leading vehicle in response to an indication by the leading vehicle for a lane change so as to increase the distance to the leading vehicle, or the longitudinal speed of the motor vehicle can be increased to a trailing vehicle in response to an indication of the trailing vehicle for a lane change so as to increase the distance to the trailing vehicle. The leading vehicle and the trailing vehicle respectively transmit the intent for a lane change in a wireless manner, e.g. via radio transmission. As soon as the motor vehicle detects the desire for a lane change, the distance to the leading vehicle or trailing vehicle is increased by reducing or increasing the longitudinal speed, respectively. In this way, adequate space is created for the vehicle when a lane change is intended.

According to another advantageous feature of the present invention, a lane change signal can be sent to the leading vehicle in response to an indication by the motor vehicle for a lane change and/or a lane change signal can be sent to a trailing vehicle in response to an indication by the motor vehicle for a lane change, and/or the distance from the motor vehicle to the leading vehicle can be increased in response to an indication by the motor vehicle for a lane change. The intent for a lane change of the motor vehicle may, for example, be triggered by a corresponding operating action of the driver. Also the driver assist system may generate the intent for a lane change.

In the presence of an indication for a lane change, the lane change signal is sent, for example, to the leading vehicle, to the trailing vehicle, or to both the leading and trailing vehicles. Advantageously, the leading and trailing vehicles are equipped for carrying out the method according to the present invention, so that the distance of the leading vehicle, the trailing vehicle, or both the leading and trailing vehicles, to the motor vehicle is increased in order to enable easy lane change.

In addition or as an alternative, the longitudinal speed of the motor vehicle can be reduced in order to increase in this way the distance to the leading vehicle. When the distance is adequate, lane change can take place.

According to another advantageous feature of the present invention, a motor vehicle of a plurality of motor vehicles in the convoy operating mode can be selected as guidance vehicle, and the guidance vehicle can be positioned as lead vehicle in a travel direction through lateral control and/or longitudinal control. Selection of the guidance vehicle can be realized through wireless communication between the vehicles in the convoy. Properties of the motor vehicles, such as equipment lists or the like can be exchanged between the vehicles. The properties can form the basis for determining which of the motor vehicles is best suited as the guidance vehicle. For example, the motor vehicle with the most sophisticated equipment, e.g. sensor system, can be chosen as guidance vehicle. Once the guidance vehicle has been selected, it drives fully autonomous, with lateral control and/or longitudinal control being implemented in such a way that the chosen guidance vehicle represents the lead vehicle in travel direction of the convoy.

According to another advantageous feature of the present invention, a distance of the motor vehicle to an upcoming road junction can be determined, when the motor vehicle operates in the automatic operating mode and/or convoy operating mode, and a warning signal can be triggered to a driver of the motor vehicle, when the distance to the road junction falls below a predefined distance. Advantageously, the distance of the motor vehicle to the upcoming road junction can be monitored by a navigation system or determined on the basis of information derived from the charging line. A road junction may involve for example a highway exit, intersection, or the like.

Provision may be made for a determination of the distance of the motor vehicle to the upcoming road junction, in particular when the road junction is imminent. When the distance drops below the predefined distance, the driver of the motor vehicle can be alerted by a warning signal. The warning signal may be an optical signal, acoustic signal, or haptic signal. A navigation system can be used to monitor the distance of the motor vehicle to the road junction. Advantageously, a route of the motor vehicle can be checked as to whether the motor vehicle has to exit the roadway at the road junction to continue on a further roadway. The warning signal is hereby triggered only when this is indeed the case. In addition or as an alternative, the distance may also be determined based on information provided by the charging line. For example, the charging line may has a marking at a specific distance to the road junction. The marking may be of optical or haptic nature.

As described above, the warning signal may be triggered only in a situation in which the motor vehicle exits the current roadway at a road junction. It is, of course, also within the scope of the present invention to trigger the warning signal for any upcoming road junction. For example, the driver of the motor vehicle may switch between these two different operating modes.

According to another aspect of the present invention, a control unit for operating a motor vehicle driven electrically, at least temporarily, on a roadway, is configured to move the motor vehicle fully autonomously in response to a command for automatic operating mode, to execute a lateral control of the motor vehicle to electrically contact an extended charging arm with a charging line arranged at or on the roadway to generate electric energy for charging an energy accumulator of the motor vehicle and/or operating a drive device of the motor vehicle for moving the motor vehicle, and to execute a longitudinal control of the motor vehicle to thereby maintain a predefined longitudinal speed until a distance of the motor vehicle reaches a predefined minimum distance to a leading vehicle.

According to still another aspect of the present invention, a motor vehicle includes a drive device configured to move the motor vehicle electrically, at least temporarily, on a roadway, and a control unit configured to operate the motor vehicle fully autonomously in response to a command for automatic operating mode, to execute a lateral control of the motor vehicle to electrically contact an extended charging arm with a charging line arranged at or on the roadway to generate electric energy for charging an energy accumulator of the motor vehicle and/or operating the drive device for moving the motor vehicle, and to execute a longitudinal control of the motor vehicle to thereby maintain a predefined longitudinal speed until a distance of the motor vehicle reaches a predefined minimum distance to a leading vehicle.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
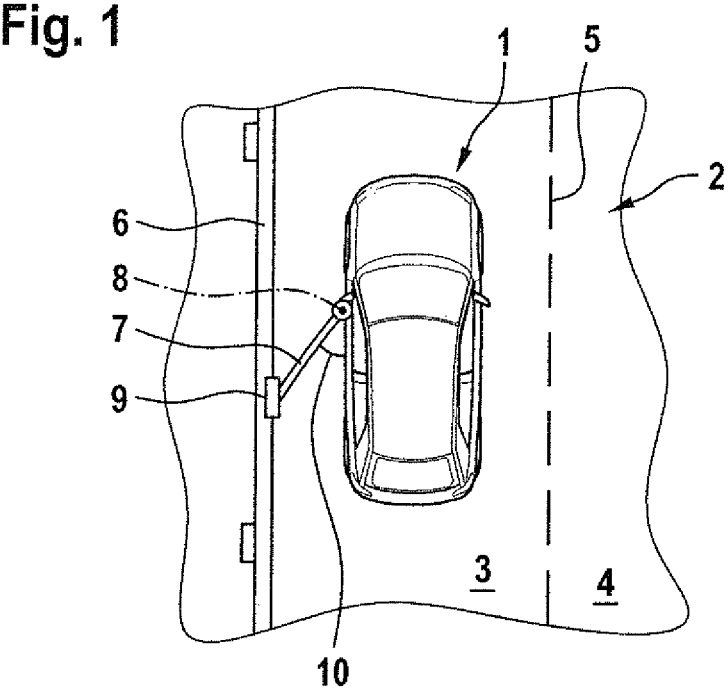
FIG. 1 is a schematic plan view of a motor vehicle according to the present invention during travel on a roadway along a charging line.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic plan view of a motor vehicle according to the present invention, generally designated by reference numeral 1 during travel on a roadway 2. The roadway 2 includes several lanes 3, 4, here two, by way of example. Lane 3 is bounded by a road surface marking 5 and a charging line 6. By way of example, the charging line 6 is configured as a charging rail and provided to supply electric energy to the motor vehicle 1.

To receive electric energy from the charging line 6, the motor vehicle 1 includes a charging arm 7 which is swingably mounted upon the motor vehicle 1 or sidewall of the motor vehicle 1 for pivoting about a rotation axis 8. On its side distal to the motor vehicle 1, the charging arm 7 has a contact region 9 for realizing the electric contact with the charging line 6. The charging arm 7 is maintained under tension by a spring force from a spring element 10. The spring force is applied so as to urge the contact region 9 in the direction of the charging line 6 so that the contact region 9 seeks the electric contact with the charging line 6.

Figure 2:
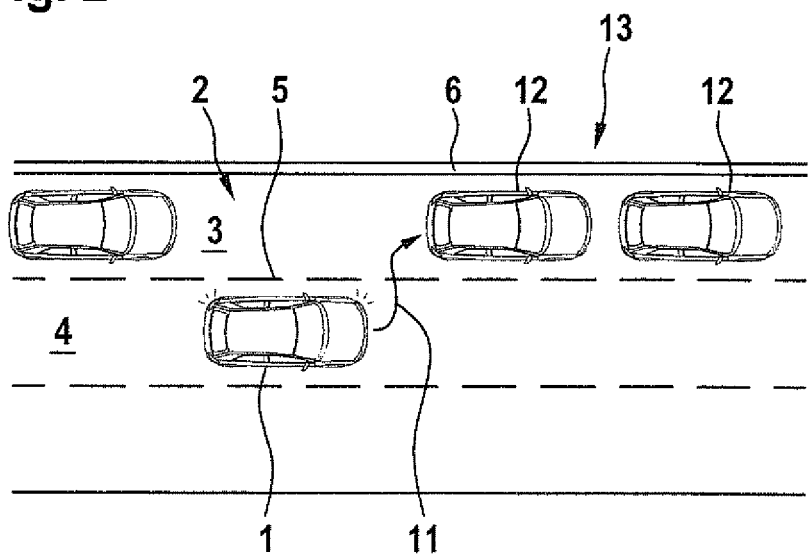
FIG. 2 is a schematic illustration of a first travel situation for the motor vehicle.
Figure 4:
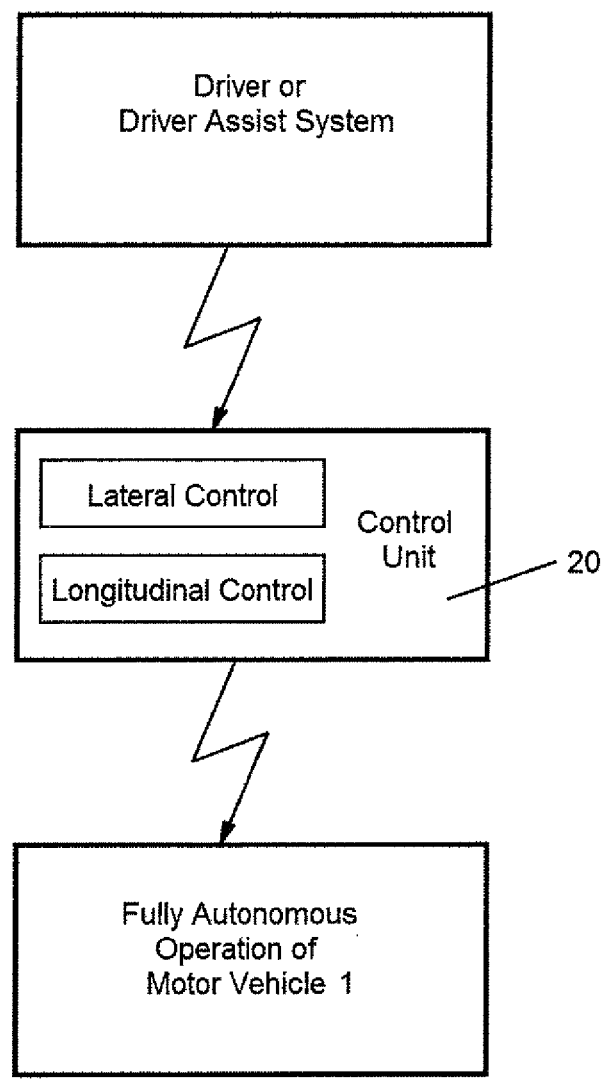
FIG. 4 is a block diagram showing the relationship and operation of a control unit with components of the motor vehicle.

FIG. 2 depicts the motor vehicle 1 in a first travel situation in which the motor vehicle 1 is initially operated manually for example. After receiving a command for executing an automatic operating mode from a driver of the motor vehicle 1 or from a driver assist system, a control unit 20 (FIG. 4) of the motor vehicle 1 assumes control of the motor vehicle 1 to operate the motor vehicle 1 in a fully autonomous manner. The motor vehicle 1 is hereby steered via a lateral control to enable the charging arm 7 to come into electric contact with the charging line 6. The lateral control effects a shift of the motor vehicle 1 into the lane 3 along which the charging line 6 is positioned, i.e. the motor vehicle 1 is steered to change from lane 4 to lane 3, as indicated by arrow 11. The motor vehicle 1 thus merges into lane 3 behind a leading vehicle 12 or behind several vehicles 12 travelling ahead so that the motor vehicle 1 forms with the leading vehicles 12 a convoy 13. In addition, a longitudinal control of the motor vehicle 1 is executed during the fully autonomous driving mode so as to maintain a predefined longitudinal speed of the motor vehicle 1 until the latter has reached a predefined minimum distance to the leading vehicle 12.

When the motor vehicle 1 during the automatic operating mode has been steered to establish electric contact between the charging line 6 and the charging arm 7 and the distance of the motor vehicle 1 to the leading vehicle 12 corresponds to the minimum distance, the control unit 20 switches from automatic operating mode to a convoy operating mode. In the convoy operating mode, the longitudinal speed of the motor vehicle 1 is adjusted to match the speed of the leading vehicle 12 so as to maintain the minimum distance.

Fully autonomous operation is also maintained in the convoy operating mode. Thus, both the lateral control and the longitudinal control are assumed by the control unit 20. Lateral control is executed for example to keep or substantially keep constant the distance of the motor vehicle 1 to the charging line 6. Longitudinal control involves an adjustment of the longitudinal speed to maintain the distance to the leading vehicle 12 constant.

Figure 3:
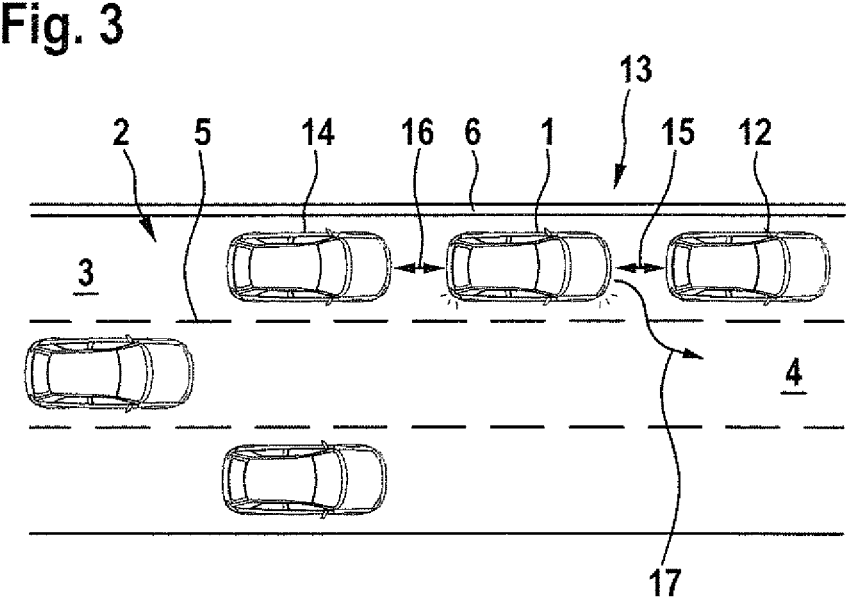
FIG. 3 is a schematic illustration of a second travel situation for the motor vehicle.

FIG. 3 depicts the motor vehicle 1 in a second travel situation in which a convoy 13 is formed by the motor vehicle 1, the leading vehicle 12, and a trailing vehicle 14, which all travel in lane 3. Advantageously, the vehicles 12, 14 can be operated in a same way as the motor vehicle 1. In this travel situation, the motor vehicle 1 wishes to depart from the convoy 13 and to change lane. This intent is indicated by turn signals, and a lane change signal is sent to the leading and trailing vehicles 12, 14.

To ensure clarity and to distinguish between the motor vehicle 1 and the other motor vehicles 12, 14, each the other motor vehicles has been designated in the description as "vehicle" for the sake of simplicity and convenience.

The fully autonomous driving mode for the vehicles 12, 14 and the motor vehicle 1 is then executed in such a way that the distances from the vehicles 12, 14 to the motor vehicle 1 increase, as indicated by double arrows 15, 16. When the respective distances are adequate, the motor vehicle 1 is able to depart the convoy 13, as indicated by arrow 17. The lane change is also implemented advantageously during fully autonomous driving mode of the motor vehicle 1, i.e. fully automatic through corresponding execution of both the lateral control and the longitudinal control.

A motor vehicle 1 according to the present invention and a method for operating such a motor vehicle allow realization of a fully autonomous electric driving mode of the motor vehicle 1 also over longer stretches. The motor vehicle 1 may operate only electrically, involving electric energy supplied by the charging line 6 during automatic operating mode and/or convoy operating mode.

At the same time, an energy accumulator of the motor vehicle 1 can be charged with electric energy. The fully autonomous driving mode of the motor vehicle 1 and the possibility for the motor vehicle 1 and the vehicles 12, 14 to travel in the convoy 13 results in a particularly energy-saving driving mode. In addition, as the driver of the motor vehicle 1 has the visual impression that the motor vehicle 1 is guided by the charging line 6, acceptance of the fully autonomous driving mode of the motor vehicle 1 is enhanced.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method of operating a motor vehicle driven electrically at least temporarily on a roadway, said method comprising:
   moving the motor vehicle fully autonomously in response to a command for automatic operating mode;
   executing a lateral control of the motor vehicle to electrically contact an extended charging arm with a charging line arranged at or on the roadway to generate electric energy for charging an energy accumulator of the motor vehicle and/or operating a drive device of the motor vehicle for moving the motor vehicle;
   executing a longitudinal control of the motor vehicle to thereby maintain a predefined longitudinal speed until a distance of the motor vehicle reaches a predefined minimum distance to a leading vehicle; and
   adjusting the longitudinal speed of the motor vehicle to a first default speed after issuance of the command for automatic operating mode, and adjusting the longitudinal speed to a second default value once the charging line has been contacted by the charging arm,
   wherein the second default value is greater than the first default speed and the second default value is set to a first value in response to no leading vehicle being detected, and the second default value is set to a larger second default value in response to a leading vehicle being detected, the larger second default value being greater than a current speed of the leading vehicle.

2. The method of claim 1, further comprising switching to a convoy operating mode, when the motor vehicle has reached the minimum distance to the leading vehicle, and adjusting the longitudinal speed of the motor vehicle to match a speed of the leading vehicle to thereby maintain the minimum distance.

3. The method of claim 2, further comprising selecting a motor vehicle of a plurality of motor vehicles in the convoy operating mode as guidance vehicle, and positioning the guidance vehicle as lead vehicle in a travel direction through lateral control and/or longitudinal control.

4. The method of claim 1, further comprising reducing the longitudinal speed of the motor vehicle relative to the leading vehicle in response to an indication of a further motor vehicle to merge so as to increase the distance to the leading vehicle and thereby provide space for the further motor vehicle.

5. The method of claim 1, further comprising increasing the longitudinal speed of the motor vehicle relative to a trailing vehicle in response to an indication of a further motor vehicle to merge so as to increase a distance to the trailing vehicle and thereby provide space for the further motor vehicle.

6. The method of claim 1, further comprising reducing the longitudinal speed of the motor vehicle relative to the leading vehicle in response to an indication by the leading vehicle for a lane change so as to increase the distance to the leading vehicle.

7. The method of claim 1, further comprising increasing the longitudinal speed of the motor vehicle relative to a trailing vehicle in response to an indication of the trailing vehicle for a lane change so as to increase the distance to the trailing vehicle.

8. The method of claim 1, further comprising sending a lane change signal to the leading vehicle in response to an indication by the motor vehicle for a lane change.

9. The method of claim 1, further comprising sending a lane change signal to a trailing vehicle in response to an indication by the motor vehicle for a lane change.

10. The method of claim 1, further comprising increasing the distance from the motor vehicle to the leading vehicle in response to an indication by the motor vehicle for a lane change.

11. The method of claim 1, further comprising determining a distance of the motor vehicle to an upcoming road junction, when the motor vehicle operates in automatic operating mode, and triggering a warning signal to a driver of the motor vehicle, when the distance to the road junction falls below a predefined distance.

12. The method of claim 11, wherein the distance of the motor vehicle to the upcoming road junction is monitored by a navigation system or determined on information derived from the charging line.

13. A control unit for operating a motor vehicle driven electrically at least temporarily on a roadway, said control unit configured to
move the motor vehicle fully autonomously in response to a command for automatic operating mode;
execute a lateral control of the motor vehicle to electrically contact an extended charging arm with a charging line arranged at or on the roadway to generate electric energy for charging an energy accumulator of the motor vehicle and/or operating a drive device of the motor vehicle for moving the motor vehicle; and
execute a longitudinal control of the motor vehicle to thereby maintain a predefined longitudinal speed until a distance of the motor vehicle reaches a predefined minimum distance to a leading vehicle,
adjust the longitudinal speed of the motor vehicle to a first default speed after issuance of the command for automatic operating mode, and adjust the longitudinal speed to a second default value once the charging line has been contacted by the charging arm,
wherein the second default value is greater than the first default speed and the second default value is set to a first value in response to no leading vehicle being detected, and the second default value is set to a larger second default value in response to a leading vehicle being detected, the larger second default value being greater than a current speed of the leading vehicle.

14. A motor vehicle, comprising:
a drive device configured to move the motor vehicle electrically at least temporarily on a roadway; and
a control unit configured to
operate the motor vehicle fully autonomously in response to a command for automatic operating mode;
execute a lateral control of the motor vehicle to electrically contact an extended charging arm with a charging line arranged at or on the roadway to generate electric energy for charging an energy accumulator of the motor vehicle and/or operating the drive device for moving the motor vehicle; and
execute a longitudinal control of the motor vehicle to thereby maintain a predefined longitudinal speed until a distance of the motor vehicle reaches a predefined minimum distance to a leading vehicle,
adjust the longitudinal speed of the motor vehicle to a first default speed after issuance of the command for automatic operating mode, and adjust the longitudinal speed to a second default value once the charging line has been contacted by the charging arm,
wherein the second default value is greater than the first default speed and the second default value is set to a first value in response to no leading vehicle being detected, and the second default value is set to a larger second default value in response to a leading vehicle being detected, the larger second default value being greater than a current speed of the leading vehicle.

* * * * *